Aug. 5, 1969 — H. E. RADACK — 3,458,887

BASTING IMPLEMENT

Filed Aug. 10, 1967

HENRY E. RADACK
INVENTOR.

BY Charles E. Lightfoot
ATTORNEY

United States Patent Office 3,458,887
Patented Aug. 5, 1969

3,458,887
BASTING IMPLEMENT
Henry E. Radack, 4278 Shurmier, Houston, Tex.
Filed Aug. 10, 1967, Ser. No. 659,734
Int. Cl. B43l 21/04; A47k 7/02
U.S. Cl. 15—210                    2 Claims

ABSTRACT OF THE DISCLOSURE

A basting implement for applying liquids to foods in the cooking of the same. The implement is of fork-like character, having an elongated handle and spaced apart tines which are disposed in a common plane. The tines are formed at their free ends with rebent, hook-like portions opening toward the handle and which extend in opposite directions away from the plane of the tines. The invention includes a sleeve-like pad of absorbent material, open at the ends and provided with a central, longitudinally extending stitched seam to enable the pad to be removably positioned on the tines by extending the tines therethrough on opposite sides of the central seam so that the outer end of the pad will be engaged in the hooks to prevent the pad from slipping off of the tines. The inner end of the pad at the location of the central seam engages the bottom of the fork between the tines to prevent the pad from sliding ono the shank portion of the handle.

---

Briefly described the invention comprises a fork-like implement having overturned free end portions at the free ends of the tines which are oppositely bent away from the general plane of the tines, and a pad of absorbent material positioned over the tines with its outer end portion engaged in the overturned ends of the tines to releasably retain the pad on the implement for use in applying liquids to foods in the cooking of the same.

Figure 1:
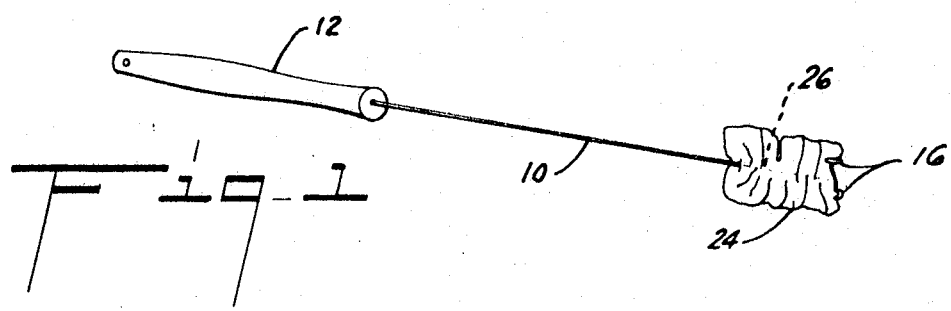
Figure 2:
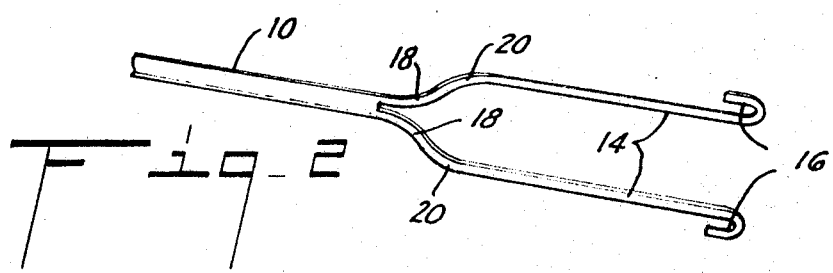
Figure 3:
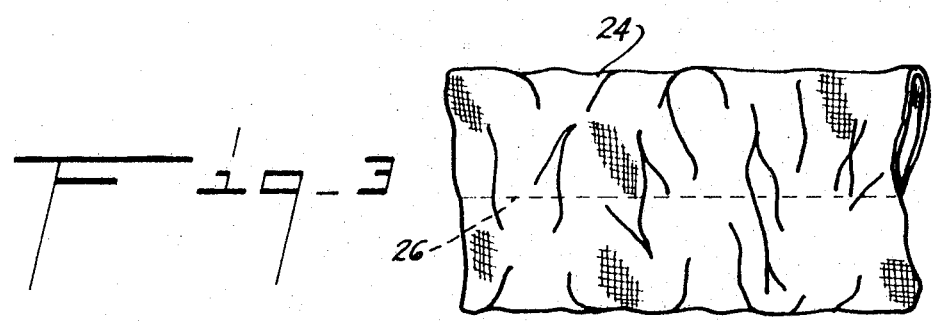
Figure 4:
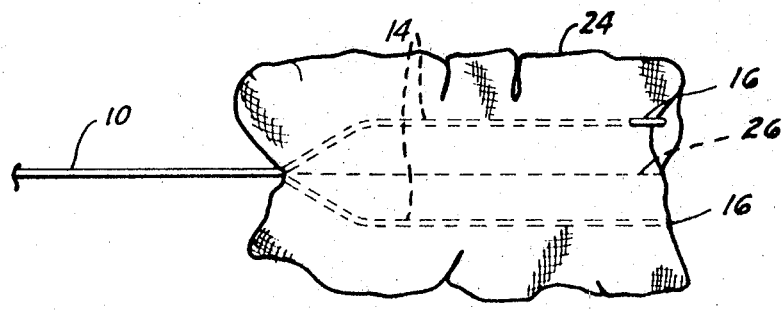

In the drawings:
FIGURE 1 is a perspective view on a reduced scale of the basting implement of the invention ready for use;
FIGURE 2 is a perspective view of the outer end portion of the implement with the absorbent pad removed;
FIGURE 3 is a plan view of the removable, adsorbent pad of the invention; and
FIGURE 4 is a plan view showing the implement with the absorbent pad in position thereon.

Referring now to the drawings in greater detail, the invention, as illustrated herein comprises a fork-like implement or holder having an elongated shaft or shank 10, which may take the form of a wire, rod, flat strip, or the like, of metal, provided or formed at one end with a handle 12, of usual construction and having at its other end a fork portion formed with spaced apart, generally parallel tines 14, each of which is formed at its free end with an overturned, hook-shaped portion 16.

The hook portions 16 extend in opposite directions away from the general plane of the tines 14.

The shank of the implement may be conveniently made from a flat strip of metal, such as steel or the like, whose free end is slitted or split longitudinally for a substantial distance to form the tines 14, the tines being bent apart near the juncture of the same with the shank 10, as shown at 18, 18, then rebent, as seen at 20, 20, substantially in parallel, spaced apart relation, after the manner of a common fork, as best shown in FIGURE 2. The free end portions of the tines may then be bent to form the hooks 16 extending in opposite directions away from the general plane of the tines.

The implement may, of course, be made of wire, not shown, the shank portion 10 being then formed of parallel strands or strands twisted together and each of the tines 14 being formed of a single wire strand having the overturned hook portion 16, or the implement may be made of other suitable material.

The invention includes an absorbent pad 24, such as that illustrated in FIGURE 3, formed of cloth or other suitable fabric or absorbent material. The pad 24 is preferably of tubular or sleeve-like shape, formed in any suitable manner, as by folding the fabric and stitching together the edge portions to form a sleeve, or the pad may be formed of stockinette or woven fabric of tubular shape.

The pad may have a central seam 26 formed by longitudinal stitches positioned for engagement at one end of the pad with the shank 10 at the inner ends of the tines 14 or the bottom of the fork to hold the pad against moving onto the shank part 10 beyond the bottom of the fork, as best shown in FIGURE 4. The pad is preferably somewhat longer than the distance between the bottom of the fork and the bights of the hooks 16.

In placing the pad on the fork, the tines are extended longitudinally through the pad, one on each side of the central stitching 26 until the inner end of the pad engages the bottom of the fork, and the pad is then bunched or compressed longitudinally until the outer end of the pad is fitted into the hooks 16, as seen in FIGURE 4. When so positioned on the implement, the pad is prevented from sliding down along the shank 10 by the engagement of the inner end of the pad with the bottom of the fork, and is prevented from slipping off of the tines by the engagement of the outer end of the pad in the hooks 16. Due to the opposite arrangement of the hooks 16, extending away from the general plane of the tines the pad will not be accidentally released from the fork, even if the pad should be bunched or compressed longitudinally to an extent to allow the outer end of the pad to move out of the hooks.

The pad may be readily removed by compressing the pad longitudinally to move the outer end of the pad from the hooks 16, after which the tines may be withdrawn from the pad.

In making use of the implement, the pad is dipped in a liquid to be applied to food, such as the gravy or juice from roasting meat, to absorb such liquid which is then used to baste the food.

Because of the readiness with which the pad may be replaced, there is no need for cleaning the pad, which may be discarded after each use and replaced by another.

It will thus be seen that the invention, constructed as described above provides a basting implement of simple design and economical manufacture which is convenient to use and which is easily maintained in a clean and sanitary condition.

The invention is disclosed herein in connection with a particular embodiment of the same, which is intended by way of illustration only, it being understood that various changes can be made within the spirit of the invention and the scope of the appended claims.

Having thus clearly shown and described the invention, what is claimed as new and desired to secure by Letters Patent is:

1. A basting implement comprising an elongated shaft formed at one end with a fork portion having spaced apart tines disposed in a common plane, a pad of absorbent material removably carried on the tines, means on the tines extending away from said plane in position for engagement with the pad to hold the pad against longitudinal displacement therefrom, said pad being of sleeve shape and having longitudinal central stitching to form an inner end portion engageable with the bottom of said fork portion to hold the pad against inward longitudinal movement of the pad beyond the bottom of said fork portion.

2. The implement as claimed in claim 1, wherein said means comprises hook-shaped end portions on the tines extending in opposite directions away from the general plane of the tines.

References Cited

UNITED STATES PATENTS

| | | |
|---|---|---|
| 119,085 | 9/1871 | Emory. |
| 586,857 | 7/1897 | Matthews. |
| 1,313,184 | 8/1919 | Hayden. |
| 1,973,093 | 9/1934 | Moore _____ 15—210 |

FOREIGN PATENTS

| | | |
|---|---|---|
| 191,846 | 1/1923 | Great Britain. |
| 294,895 | 12/1928 | Great Britain. |

DANIEL BLUM, Primary Examiner